(12) United States Patent
Wong et al.

(10) Patent No.: US 10,813,089 B2
(45) Date of Patent: Oct. 20, 2020

(54) ROLL-CALL CHANNEL ACCESS

(71) Applicant: Apple Inc., Cupertino, CA (US)

(72) Inventors: Chiu Ngok Eric Wong, Cupertino, CA (US); David Cheung, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/270,475

(22) Filed: Sep. 20, 2016

(65) Prior Publication Data

US 2018/0084574 A1 Mar. 22, 2018

(51) Int. Cl.
*H04W 72/04* (2009.01)
*H04W 74/04* (2009.01)
*H04W 84/12* (2009.01)

(52) U.S. Cl.
CPC ....... *H04W 72/0446* (2013.01); *H04W 74/04* (2013.01); *H04W 84/12* (2013.01)

(58) Field of Classification Search
None
See application file for complete search history.

(56) References Cited

U.S. PATENT DOCUMENTS

| 2007/0150720 A1* | 6/2007 | Oh | H04L 63/065 |
| | | | 713/153 |
| 2014/0029499 A1* | 1/2014 | Chu | H04W 52/0206 |
| | | | 370/311 |
| 2016/0381565 A1* | 12/2016 | Oteri | H04W 16/14 |
| | | | 370/328 |

* cited by examiner

*Primary Examiner* — Christopher M Crutchfield
*Assistant Examiner* — Alan L Lindenbaum
(74) *Attorney, Agent, or Firm* — Sterne, Kessler, Goldstein & Fox P.L.L.C.

(57) ABSTRACT

Embodiments include a method, computer program product, and system for grouping electronic devices into roll-call channel access (RCCA) groups to reduce the number of devices contending for a wireless channel. Devices within RCCA groups are represented a host device during a channel contention process. Once a channel is granted access to a host device, its respective RCCA group has control of the channel for a predetermined period of time during which devices of the RCCA group take turns transmitting data on the channel.

21 Claims, 10 Drawing Sheets

ROLL-CALL CHANNEL ACCESS

BACKGROUND

Field

The described embodiments relate to techniques for controlling access to a shared wireless medium including delay minimization in accessing the medium and control of packet latency when transmitting over the medium.

Related Art

In order to transmit information through a wireless local area network (WLAN), devices connected to the WLAN contend for access to a shared channel within the WLAN. The devices include a WLAN interface (e.g., a wireless network such as described in the Institute of Electrical and Electronics Engineers (IEEE) 802.11 standard, sometimes referred to as "WiFi"). Contention for the shared channel can be a "free-for-all," where each device contends for the shared channel. Each device is assigned a random time to wait before it can transmit information on the channel. This random time, or backoff, can depend on the type of information to be sent by the device. For example, enhanced distributed channel access (EDCA) in the IEEE 802.11e standards can provide four access categories of information: voice (VO), video (VI), best effort (BE), and background (BK).

The amount of time that each device waits (after sensing that the channel is busy) before transmitting information depends on default access category parameters Short Interframe Space (SIFS) and Arbitration Inter-frame Space Number (AIFSN), and may be represented by the following formula:

Counter=SIFS+AIFSN+Random Backoff

The values for AIFSN, and Random Backoff depend on the access category, CWmin, and CWmax. The values for AIFSN for each access category are constant. Once a device has waited the appropriate time period defined by SIFS plus AIFSN, the device then randomly selects a value for its random backoff timer. This value varies within a range between 0 and an upper bound CWmin, where CWmin is defined for each access category. This channel access technique is known as Enhanced. Distributed Channel Access (EDCA).

EDCA allows devices within the WLAN to "play nice" and share the channel in a fair manner. However, channel access becomes increasingly challenging as the number of devices within the WLAN increases. This is because of the additional time can be spent resolving over-the-air contentions. As the number of devices contending for the wireless medium increases, the delays in gaining to access the channel for each device also increase.

SUMMARY

The described embodiments relate to implementing a roll-call technique in the channel contention process where devices may be organized into roll-call channel ("RCCA") groups to reduce the number of overall devices that are contending for the channel.

Embodiments include a method and system for grouping electronic devices into different RCCA groups to streamline the contention process within a WLAN by reducing the number of devices contending for access to a channel. Each RCCA group assigns a host device the responsibility to contend for access to the channel on behalf of its members (e.g., the electronic devices) of the RCCA group. In this manner, access to the channel is granted to the RCCA group (instead of individual electronic devices within the RCCA group). Once an RCCA group is granted access to the channel, the respective host device determines a transmission opportunity window that is based at least in part on the number of members within the RCCA group and allocates pre-assigned slots within this transmission opportunity window to the members. The pre-assigned slots can be unique to each member, which in turn prevents transmission collisions from occurring while the RCCA group has access to the channel.

There may be any number of RCCA groups within the WLAN, but each RCCA group is assigned a host device and includes at least one electronic device. In addition to being responsible for channel contention, the host device administratively manages the RCCA group to which it has been assigned. For example, a host device may be responsible for assigning electronic devices within a WLAN to a particular RCCA group, which may include randomly assigning the electronic device to an RCCA group and/or utilizing one or more criteria to determine membership in the RCCA group. Examples of such criteria include a traffic type/quality of service (QoS) category to be transmitted by the electronic device and the type of electronic device. The host device may also be responsible for establishing network parameters for each RCCA group to which it is assigned. These network parameters, which may include polling intervals and EDCA parameters such as SIFS, AIFSN, and CWmin values, governs how data is transmitted when the RCCA group has access to the channel.

Some embodiments include a method for accessing the channel. The method includes forming at least one RCCA group that includes at least a first electronic device; assigning, to each device within the RCCA group, a back-off count, where the back-off count for each device is unique and indicates a time period in which each device waits before transmitting data; contending, by the host device, for access to a channel; and upon receiving access to the channel, transmitting, by the host device, a polling packet that includes a duration parameter.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
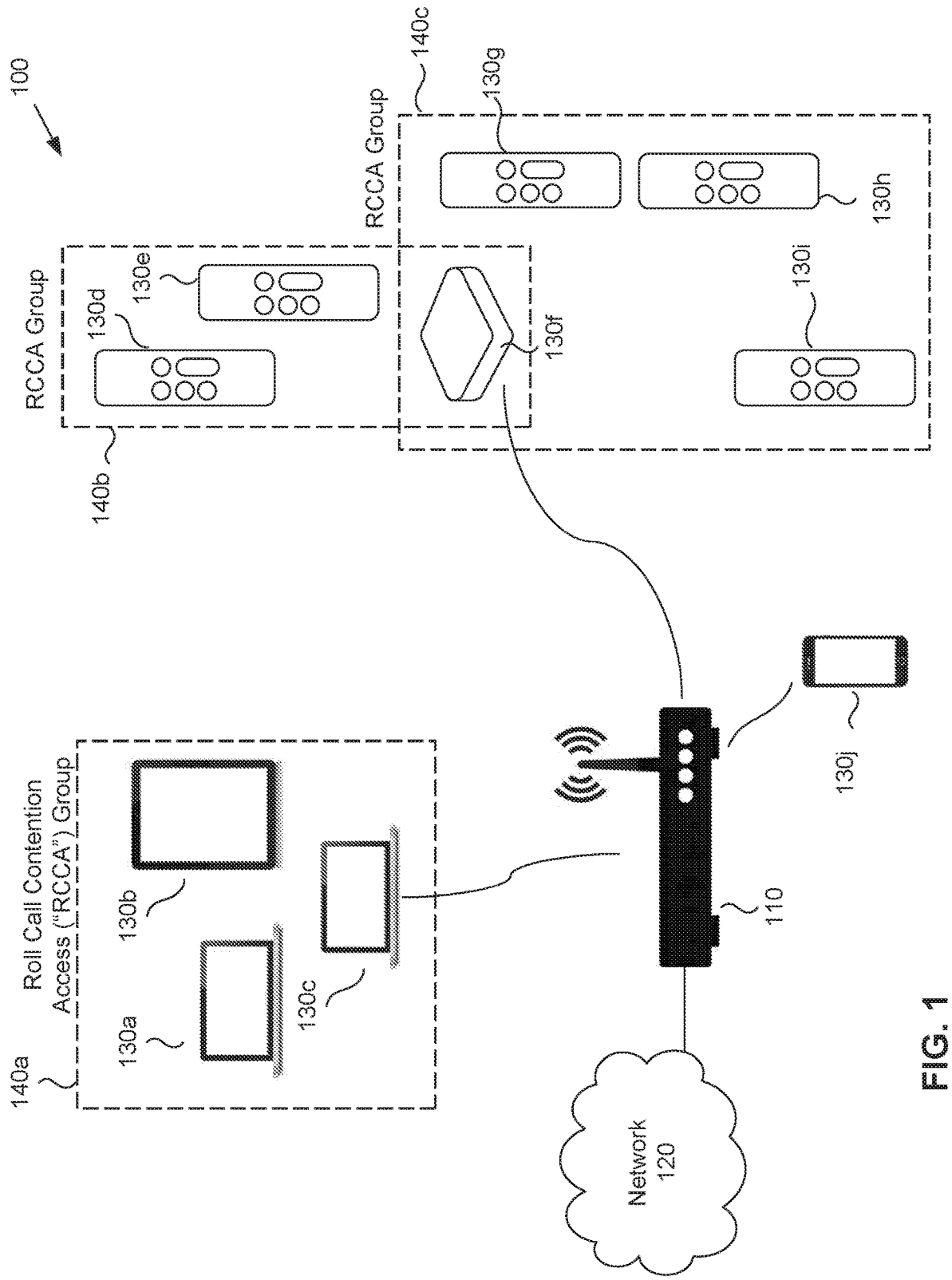
FIG. 1 is a block diagram that illustrates an example system implementing a roll-call channel access (RCCA) mechanism, according to some embodiments of the disclosure.

The present disclosure is described with reference to the accompanying drawings. In the drawings, generally, like reference number s indicate identical or functionally similar elements. Additionally, generally, the left-most digit(s) of a reference number identifies the drawing in which the reference number first appears.

DETAILED DESCRIPTION

FIG. 1 is a block diagram that illustrates an example system 100, according to some embodiments of the disclosure. System 100 includes access point 110 that provides access to a network 120. Connected to an access point 110 may be electronic devices 130a-j. Electronic devices 130a-j may include, but are not limited to, set-top boxes, remote controls, game controllers, cellular phones, smart phones, wearable devices, tablets, personal digital assistants (PDAs), or laptop and/or desktop computers. For example, in some embodiments, electronic devices 130a and 130c may be laptops, electronic device 130b may be a tablet, electronic devices 130d, 130e, 130g, 130h, and 130i may be remote/game controllers, electronic device 130f may be a set-top box (or other such media playback device), and electronic device 130j may be a smart phone. Other configurations of system 100 that include differing numbers or types of devices are possible and within the scope of the disclosure.

Network 120 may include, but is not limited to, any combination of local area networks (LANs), metropolitan area networks (MANs), wireless local area networks (WLANs), and/or the Internet.

According to some embodiments of the disclosure, electronic devices 130a-j may be grouped into one or more roll-call channel access (RCCA) groups, e.g., groups 140a-140c. System 100 includes access point 110 that provides RCCA groups 140a-140c access to network 120. RCCA group 140a may include electronic devices 130a-c. RCCA group 140b may include electronic devices 130d-f. RCCA group 140c may include electronic devices 130f-i. In the present example, electronic device 130j is not included within an RCCA group.

An RCCA group includes one host and at least one group member, which may be a device designated with an identifier by the host. The group member may be a human interface device (HID) such as a mouse, keyboard, track pad, game controller, or remote control.

However, other types of devices such as set-top boxes (STB), tablets, laptops, or cell phones, may be included in the RCCA group. For example, the RCCA group may be heterogeneous by containing different types of devices such as both HIDs and STBs. Formation of the RCCA groups may depend on a number of factors including, but not limited to, the type of electronic device (e.g., one RCCA group may include remote controllers and another RCCA group may include smartphones) or the type of data that each electronic device typically transmits (e.g., one RCCA group may include electronic devices that send voice data and another RCCA group may include electronic devices that send video data, and another RCCA group may include electronic devices that send a mix of data such as background and best-effort data). In some embodiments, different, additional, or no factors also may be considered in RCCA group formation.

There may be different conditions that trigger formation of the RCCA groups. For example, RCCA groups may be the default method for transmitting data within a system so formation of RCCA groups are triggered automatically, such that devices within and newly entering the system are automatically and dynamically designated as either a host or as a device in the group that is assigned an identifier within a RCCA group. Alternatively, formation of RCCA groups may be triggered when network conditions meet a certain threshold, where these conditions include but are not limited to network throughput, the number of collisions within the system, or the number of electronic devices contending for access to the channel.

Any electronic device within an RCCA group has the capability of hosting an RCCA group and can be designated as a host, according to some embodiments. This designation may be performed dynamically by access point 110, by the electronic device itself, or as elected by other electronic devices within system 100. Alternatively, according to some embodiments, the designation may be performed statically, where predetermined electronic devices are designated as the host for a RCCA group, e.g., by manufacturers of the electronic device. Formation of RCCA groups 140a-c may be done by respective hosts for each RCCA group or by access point 110. Formation of RCCA groups includes designating the remaining electronic devices within the system (that have not been designated as hosts) with identifiers. RCCA groups may include a single host and multiple group members, such as HIDs that have designated IDs. An electronic device may be designated as host to more than one RCCA group. Alternatively, an electronic device may be designated as a HID to one or more RCCA group.

In some embodiments as described above, the electronic devices of FIG. 1 may be assigned as group members with designated identifiers HIDs or appointed as hosts of their respective RCCA group. For example, electronic devices 130a and 130b of RCCA group 140a may each be HIDs and assigned with identifiers HID and HID2, respectively, and electronic device 130c may be assigned as host for RCCA group 140a. Similarly, for RCCA group 140b, electronic devices 130d and 130e may also be HIDs and assigned with identifiers HID1 and HID2, respectively, and electronic device 130f may be assigned as a host. For RCCA group 140c, electronic devices 130g, 130f, and 130i may also be HIDs and assigned with identifiers HID1, HID2, and HID3, respectively, and electronic device 130f may be assigned as a host. Because electronic device 130j is not part of an RCCA group, it is not assigned an identifier or as a host. Other assignments of host and identifiers are possible and within the scope of the disclosure.

As hosts, electronic devices 130c and 130f are responsible for managing their respective RCCA groups. For example, as hosts, electronic devices 130c and 130f may assign unique transmission positions within their RCCA group to each group member. Unique transmission positions ensure that each group member has contention-free access to the channel for transmitting its data. Transmission positions are discussed in more detail below with respect to the unique back-off count feature with regard to FIGS. 3-8.

Electronic device 130j is not part of an RCCA group, but may also be connected to access point 110. Importantly, the access point 110 views RCCA groups 140a-c similarly to electronic device 130j. Electronic devices 130c and 130f (on behalf of their respective RCCA groups 140a and 140b-c) and electronic device 130j contend for access to a channel in order to transmit data. Electronic devices 130a, 130b, 130d, 130e, and 130g-i typically do not participate in a channel access contention mechanism in order to minimize contention; their respective host (e.g., electronic devices 130c or f) is responsible for contending and obtaining access to the channel. However, group members in RCCA groups are allowed to contend for the channel outside of their respective RCCA group if the group member has urgent data to send on the channel. Once either electronic device 130c or 130f is granted access to the channel, its respective RCCA group and the member electronic devices that have been assigned identifiers will control the channel for a predetermined period of time. Within this predetermined period of time, electronic devices within the RCCA group that controls the channel will take turns transmitting data. These functions are discussed in more detail below with respect to FIGS. 2-9.

As noted above, hosts may form RCCA groups based on the type of traffic being transmitted by each device. Organizing RCCA groups based on, for example, devices that transmit voice traffic and devices that transmit video traffic, allows hosts to optimize EDCA parameters for each RCCA group. EDCA parameters include any/all of minimum contention window, maximum contention window, an arbitration inter-frame spacing number, and transmission opportunities.

Other functions of the host include administratively maintaining the RCCA group when group members join or leave the RCCA group. According to some embodiments, the host may be responsible for pruning group members from the RCCA group. For example, the host may require group members to transmit keep-alive or heartbeat messages to maintain membership. If a group member do not transmit such messages within an inactivity timer maintained by the host, the host may remove the group member from the RCCA group. Alternatively, the host may actively ping a specific group member and request a response. If a group member does not respond to a ping within a predetermined period of time, the host may remove the group member from the RCCA group. Group members may also maintain a timeout counter to monitor when to transmit keep-alive or heartbeat messages or responses to pings from the host to avoid being removed from the RCCA group.

When a group member is removed (or leaves) a group, the host may reassign its transmission position within the RCCA group to another group member to avoid periods where the polling group does not transmit data when controlling the channel, according to some embodiments. In other embodiments, the host may restructure one or more parameters for the group.

A host also is responsible for maintaining fairness in transmitting data for the group members within its polling group. According to some embodiments, this may include varying the transmission positions for the group members, e.g., each time the host is granted control of the channel or at other instances. For example, the host may utilize round-robin techniques for assigning transmission positions, may prioritize devices that have more urgent data to transmit, may prioritize devices that have data to transmit versus devices that do not have data to transmit, or may prioritize devices based on the size or amount of data needed to be transmitted. Prioritization of devices may mean assigning devices transmission positions such that the devices transmit their data prior to other devices. In some embodiments, prioritization may be accomplished based on a unique back-off count, which is discussed in more detail with regard to FIGS. 3-8.

Figure 2:
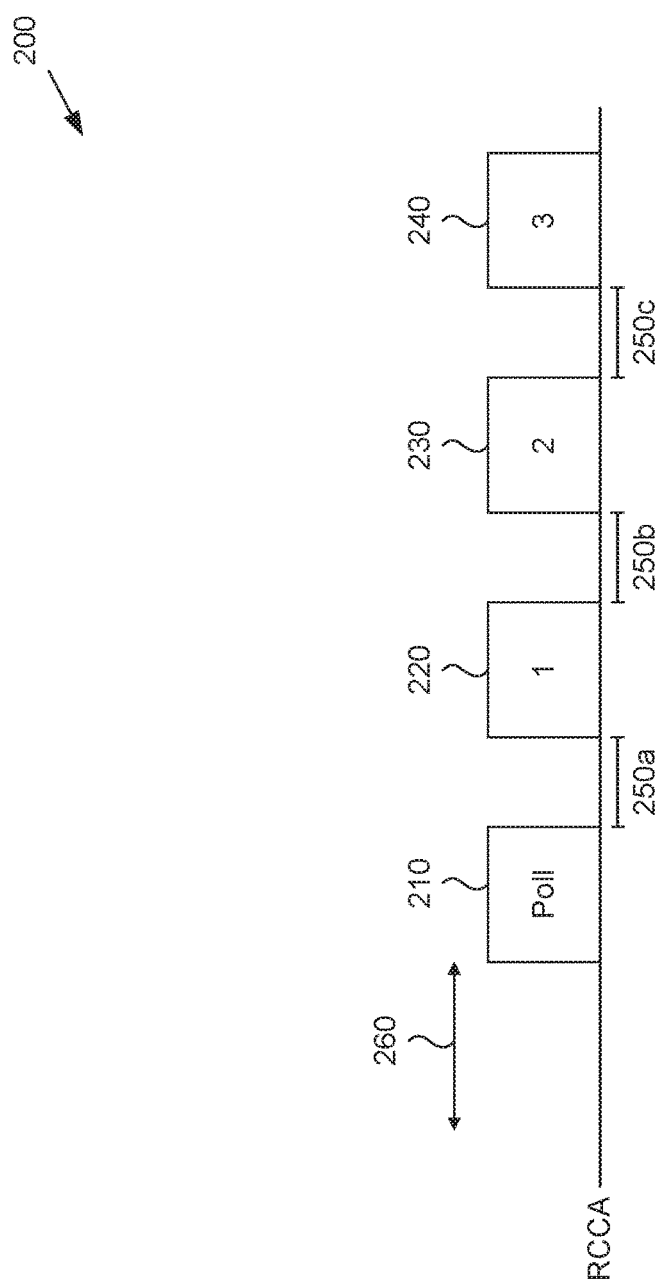
FIGS. 2-7 illustrate example RCCA mechanisms, according to some embodiments of the disclosure.

FIG. 2 illustrates an example roll-call channel access (RCCA) mechanism 200, which illustrates the transmission of data by an RCCA group (e.g., 140c) including a host (e.g., electronic device 130f) and group members (e.g., electronic devices 130g, 130h, and 130i). A contention routine 260 (e.g., EDCA/DCF) takes place where the host contends for access to the channel. After receiving access to the channel, the host reserves an RCCA transmission opportunity, or a network access vector (NAV), for its RCCA group by transmitting a poll frame 210, which may include the RCCA transmission opportunity value within a field in poll frame 210. The RCCA transmission opportunity represents a contention free period in which the RCCA group has sole access to the channel, and is indicated by an initial time duration. In some embodiments, the initial time duration may be calculated based on a minimum time for the last HID within the RCCA group to transmit at least one data packet. In some embodiments, the RCCA transmission opportunity may be calculated using the following equation, where $T_{poll}$ represents the time it takes to transmit polling frame 210, $T_{sifs}$ represents a time corresponding to a short inter-frame space (SIFS), n represents the number of devices in the RCCA group, and $T_{slottime}$ represents a time for each transmission slot on the channel:

$$\text{RCCA Transmission Opportunity} = T_{poll} + T_{sifs} + n \times T_{slottime}$$

$T_{sifs}$ represents the amount of time that the host and group members within the RCCA group wait to transmit their data (e.g., acknowledgements, packets) after transmission of data on the channel. Other equations for calculating the RCCA transmission opportunity are within the scope of the invention. One consideration in calculating the RCCA transmission opportunity is that the RCCA transmission opportunity should be minimized so that an RCCA group does not control the channel unfairly. The RCCA transmission opportunity may therefore represent the length of time that allows each group member within an RCCA group to begin transmission of its data.

In referring to FIG. 2, after transmission of poll frame 210, the RCCA group waits for a predetermined amount of time 250a, after which a first group member transmits a packet 220. After transmission of packet 220, the RCCA group waits for another predetermined amount of time 250b, after which a second group member transmits a packet 230. After transmission of packet 230, the RCCA group waits for another predetermined amount of time 250c, after which a third group member transmits a packet 240. Each transmission of packets 220, 230, and 240 results in extension of the RCCA transmission opportunity for the RCCA group.

Figure 3:
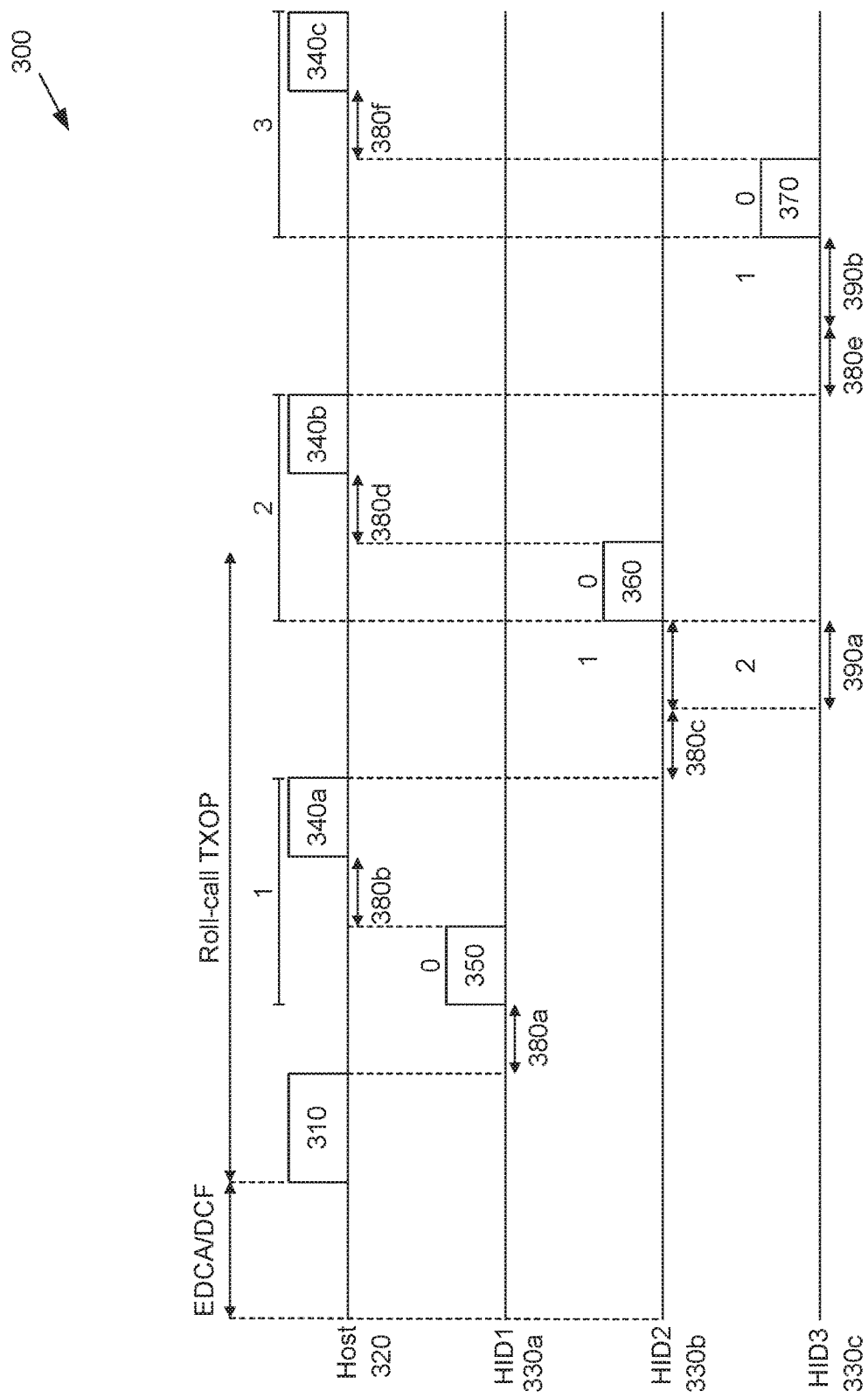

FIG. 3 illustrates an example of an RCCA mechanism 300, according to some embodiments of the disclosure. A host 320 is equivalent to, e.g., electronic device 130f, and group members 330a-c are equivalent to, e.g., electronic devices 130g-i. Host 320 and group members 330a-c all have access to the channel and can sense when data is transmitted on the channel. After contending for and obtaining access to the channel during a normal contention period (e.g., EDCA/DCF), host 320 transmits a poll frame 310. Transmission of poll frame 310 can mark the beginning of the roll-call transmission opportunity over the channel for the RCCA group. In this example, the roll-call transmission opportunity may be calculated using the following formula:

$$\text{RCCA Transmission Opportunity} = T_{poll} + T_{sifs} + 3 \times T_{slottime}$$

Because the RCCA group includes three group members, the calculated RCCA transmission opportunity includes a calculation of $3 \times T_{slottime}$. Calculated in this manner, the RCCA transmission opportunity is the minimum time that allows the third group member 330c within the RCCA group to transmit data over the channel.

In order to determine the order in which group members 330a-c may transmit data over the channel, host 320 is responsible for assigning a unique back-off count to each group member 330a-c. Host 320 may assign the unique back-off count at any time prior to when group members 330a-c transmit their data. For example, host 320 may assign the unique-back count after the RCCA group obtains control of the channel. In some embodiments, the unique back-off count indicates the number of transmission slots that each group member waits prior to transmitting a packet, and may be based, in part, on the number of group members within each RCCA group. For example, a unique back-off count of 0 may represent zero time slots. The purpose of the unique back-off count is to enable contention free transmission between the group members 330a-c within the contention free transmission period (e.g., roll-call transmission opportunity) that has been granted to host 320 and its RCCA group. Host 320 may use any method to assign the unique back-off count to each group member 330a-c. In one embodiment, host 320 uses a random assignment technique, a round robin technique, and/or may assign the unique back-off count based on the type of data (e.g., VO, VI, BE, BK) that each device needs to transmit. In this manner, host 320 may prioritize certain group members by assigning lower unique back-off counts such that they transmit their data prior to other group members.

In this embodiment, group members 330a-c are HIDs and are assigned, as identifiers, HID1, HID2, and HID3, respectively. In this discussion, group members 330a-c will be addressed based on their respective identifiers. However, group members 330a-c are not limited to HIDs and may be implemented as other types of devices as discussed above. In this example, host 320 assigns group member, or HID1, 330a a unique back-off count of 0, group member, or HID2, 330b a unique back-off count of 1, and group member, or HID3, 330c a unique back-off count of 2. After host 320 transmits poll frame 310, devices in the RCCA group (e.g., host 320 and group members 330a-c) wait a predetermined period of time 380a (e.g., SIFS). Because HID1 330a has an assigned unique back-off count of 0,HID1 330a does not need to wait for transmission slots before transmitting its packet 350 on the channel. HID2 330b and HID3 330c have a unique back-off count of 1 and 2, and therefore wait 1 and 2 transmission slots respectively, before transmitting data.

After HID1 330a transmits packet 350, the channel is free and devices within the RCCA group (e.g., host 320 and group members 330a-c) wait a predetermined period of time 380b (e.g., SIFS). If the channel remains free during predetermined period of time 380b (e.g., no devices within the RCCA group is using the channel), host 320 transmits an acknowledgement 340a on the channel. In other embodiments, group members 330a-c may transmit packets to any destination beside host 320; in such a case, the destination that receives the packets would be responsible for sending an acknowledgement on the channel. After transmission of acknowledgement 340a, the channel becomes free again, and devices again wait a predetermined period of time 380c (e.g., SIFS) and transmission slot 390a. If the channel remains free during predetermined time period 380c and transmission slot 390a, HID2 330b (which has a unique back-off count of 1) decrements its unique back-off count based on a waiting transmission slot 390a. HID2 330b now has a unique back-off count of 0. Concurrently, HID3 330c (which has a unique back-off count of 2) decrements its unique back-off count and has a resulting unique back-off count of 1.

After decrementing its unique back-off count and determining that its value is 0 and waiting transmission slot 390a, HID2 330b transmits its packet 360. After transmission of packet 360, devices within the RCCA group wait a predetermined period of time 380d (e.g., SIFS). If the channel remains free during predetermined period of time 380d, host 320 transmits an acknowledgement 340b on the channel. After transmission of acknowledgement 340b, the channel becomes free again, and devices within the RCCA group again wait a predetermined period of time 380e (e.g., SIFS) and transmission slot 390b. If the channel remains free during predetermined period of time 380e and transmission slot 390b, HID3 330c (which currently has a unique back-off count of 1) decrements the unique back-off count to 0. After decrementing its unique back-off count and determining that its value is 0, HID3 330c transmits its packet 370.

After HID3 330c transmits its packet 370, the channel is free and devices within the RCCA group (e.g., host 320 and HIDs 330a-c) wait a predetermined period of time 380f (e.g., SIFS). If the channel remains free during predetermined period of time 380f, host 320 transmits an acknowledgement 340c. Since all HIDs 330a-c have transmitted their packets, the RCCA group relinquishes control of the channel.

Figure 4:
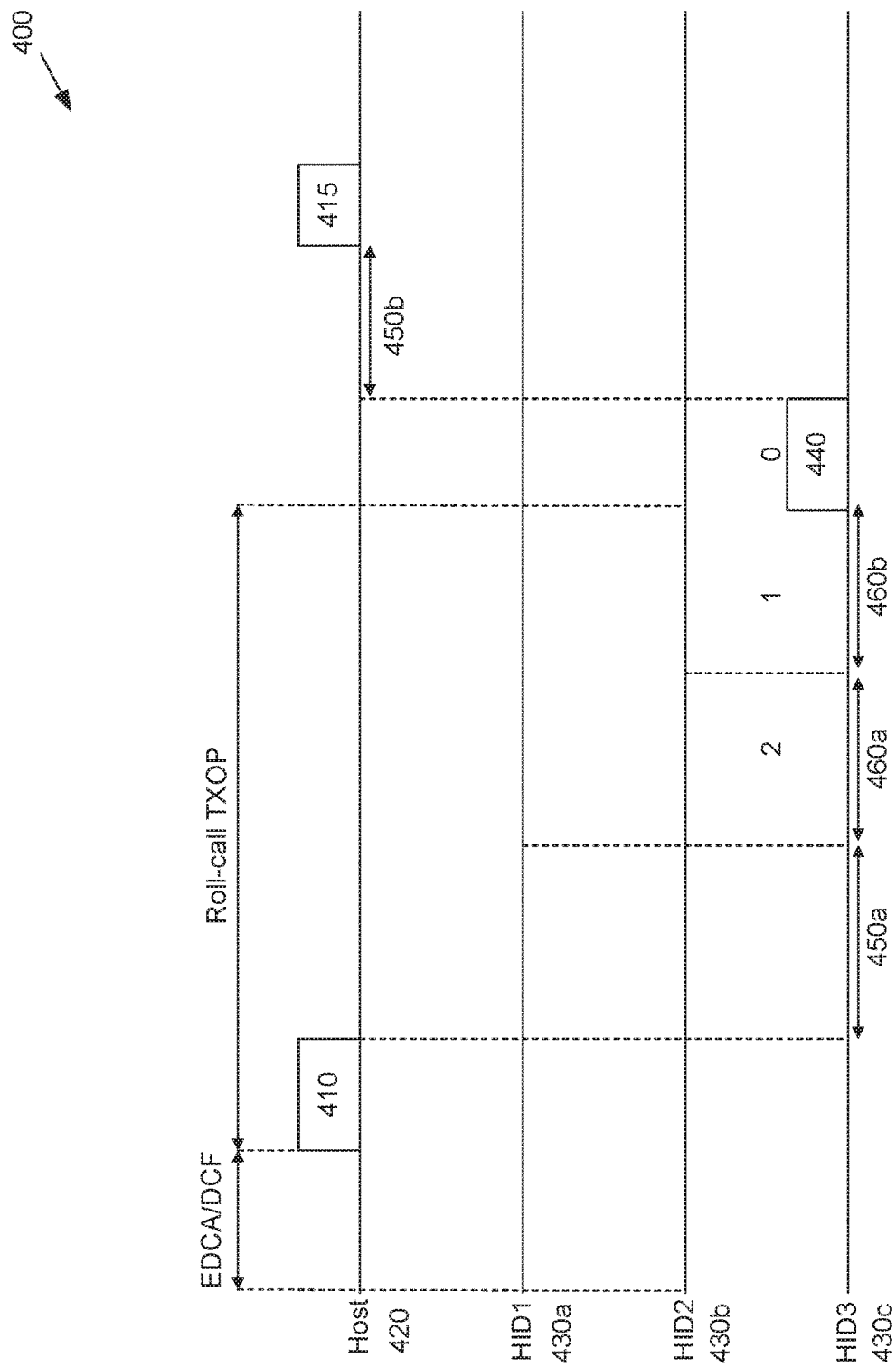

FIG. 4 illustrates an example of an RCCA mechanism 400, according to some embodiments of the disclosure. Host 420 is equivalent to, e.g., electronic device 130f, and group members 430a-c are equivalent to, e.g., electronic devices 130g-i. In this embodiment, group members 430a-c are HIDs and are assigned, as identifiers, HID1, HID2, and HID3, respectively. In this discussion, group members 430a-c will be addressed based on their respective identifiers. However, group members 430a-c are not limited to HIDs and may be implemented as other types of devices as discussed above. In this example, group member, or HID1, 430a and group member, or HID2, 430b do not have data to transmit, but group member, or HID3, 430c does have data to transmit. HID3 430c has been assigned a unique back-off count of 2, which indicates that HID3 430c waits 2 transmission slots before transmitting data.

After contending for and obtaining access to the channel during a contention period (e.g., EDCA/DCF), host 420 transmits a poll frame 410. Transmission of poll frame 410 can mark the beginning of the roll-call transmission opportunity over the channel for the RCCA group. Because there are three HIDs 430a-c in the RCCA group, the roll-call transmission opportunity may be calculated using the following formula:

$$\text{RCCA Transmission Opportunity} = T_{poll} + T_{sifs} + 3 \times T_{slottime}$$

In order to determine the order in which HIDs 430a-c may transmit data over the channel, host 420 is responsible for assigning a unique back-off count to each HIDs 430a-c. As discussed with respect to FIG. 2, the unique back-off count controls the order in which HIDs 430a-c transmit data on the channel. In some embodiments, host 420 may assign a unique back-off count to each HID 430a-c in the RCCA group, regardless of whether the HID has data to transmit. In this example, host 420 assigns HID1 430a a unique back-off count of 0, HID2 430b a unique back-off count of 1, and HID3 430c a unique back-off count of 2.

After transmission of poll frame 410, devices in the RCCA group (e.g., host 420 and HIDs 430a-c) wait a predetermined period of time 450a (e.g., SIFS). Time 450a may be shorter in duration than the time period of time in which HID1 430 may use to transmit any data if it had data to send. Because HID 430a has an assigned unique back-off count of 0, HID1 430a does not wait for any transmission slots to transmit data after waiting predetermined period of time 450a. However, in this example, HID1 430a does not have data to transmit. Devices in the RCCA group sense that the channel has remained free and wait a transmission slot 460a. After waiting transmission slot 460a, HID2 430b and HID3 430c decrement their respective unique back-off counts. After decrementing, HID2 430b, which has an assigned unique back-off count of 1, now has a unique back-off count of 0. HID3 430c, which has an assigned unique back-off count of 2, now has a unique back-off count of 1.

After decrementing its unique back-off count and determining that its value is 0 and waiting transmission slot 460a, HID2 430b may transmit data. In this example, HID2 430b does not have data to transmit so the channel remains free. HID3 430c senses that the channel has remained free without any transmission of data. Because HID3 430c currently has a unique back-off count of 1, HID3 430c waits a transmission slot 460b. After waiting for transmission slot 460b, HID3 430c decrements its unique back-off count, which is now equal to 0. Because the unique back-off count is equal to 0, HID3 430c may now transmit packet 440. After transmission of packet 440, devices wait a predetermined period of time 450b and host 420 transmits an acknowledgement 415. With devices in the RCCA group having had an opportunity to transmit data, the RCCA group relinquishes control of the channel.

Figure 5:
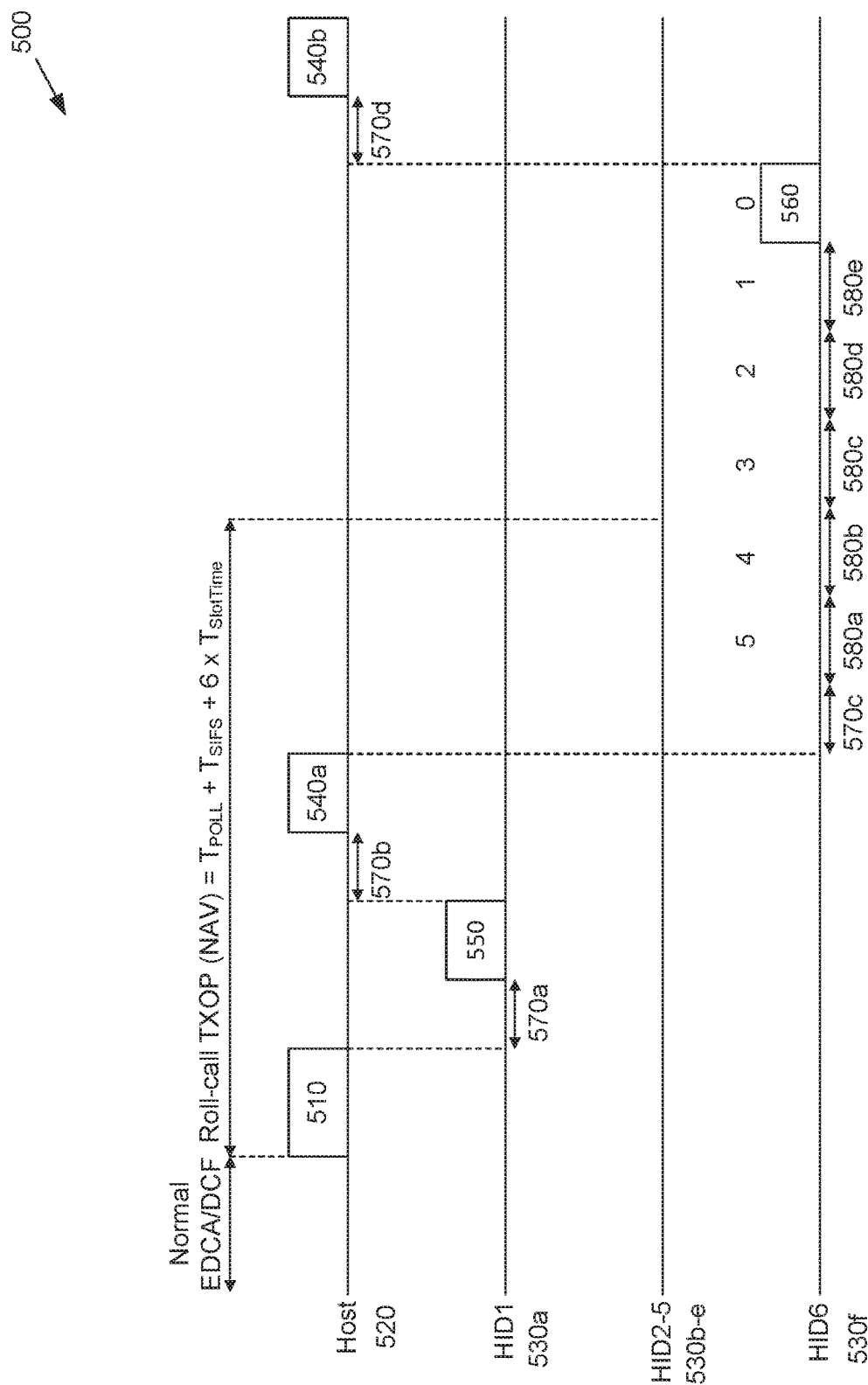

FIG. 5 illustrates another example of an RCCA mechanism 500, according to some embodiments of the disclosure. In this embodiment, group members 530a-f are HIDs and are assigned, as identifiers, HID1, HID2, HID3, HID4, HID5, and HID6, respectively. In this discussion, group members 530a-f will also be addressed based on their respective identifiers. However, group members 530a-f are not limited to HIDs and may be implemented as other types of devices as discussed above. In this example, group member, or HID1, 530a and group member, or HID6, 530f may have data to send, while group member, or HID2, 530b, group member, or HID3, 530c, group member, or HID4, 530d, and group member, or HID5, 530e do not have data to send. HID1 530a has been assigned a unique back-off count of 0, which indicates that HID 530a does not have to wait for any transmission slots before transmitting data. HID6 530f has been assigned a unique back-off count of 5, which indicates that HID6 530f waits 5 time slots before transmitting data. In some other implementations, HID6 530f can have any other back-off count and will transmit in its designated order, following the described mechanism.

After contending for and obtaining access to the channel during a contention period (e.g., EDCA/DCF), host 520 transmits a poll frame 510. Transmission of poll frame 510 can mark the beginning of the roll-call transmission opportunity over the channel for the RCCA group. Because there are six HIDs 530a-f in RCCA group, the roll-call transmission opportunity may be calculated using the following formula:

RCCA Transmission Opportunity=$T_{poll}+T_{sifs}+6\times T_{slottime}$

In order to determine the order in which HIDs 530a-f may transmit data over the channel, host 520 is responsible for assigning a unique back-off count to each HID 530a-f. As discussed with respect to FIG. 2, the unique back-off count controls the order in which HIDs 530a-f transmit data on the channel. In some embodiments, host 520 may assign a unique back-off count to each HID530a-f in the RCCA group, regardless of whether the HID has data to transmit. In this example, host 520 assigns HID1 530a a unique back-off count of 0, HID2 530b a unique back-off count of 1, HID2 530b a unique back-off count of 1, HID3 530c a unique back-off count of 2, HID4 530d a unique back-off count of 3, HID5 530e a unique back-off count of 4, and HID6 530f a unique back-off count of 5. However, any other order also could be assigned.

After transmission of poll frame 510, devices in the RCCA group (e.g., host 520 and HIDs 530a-f) wait a predetermined period of time 570a (e.g., SIFS). Because HID1 530a has an assigned unique back-off count of 0, HID1 530a does not need to wait for any transmission slots after waiting predetermined period of time 570a to transmit data in the form of packet 550. After HID1 530a transmits packet 550, the channel is free and devices within the RCCA group (e.g., host 520 and HIDs 530a-f) wait a predetermined period of time 570b (e.g., SIFS). If the channel remains free during predetermined period of time 570b, host 520 sends an acknowledgement 540a. Devices in the RCCA group sense transmission of the acknowledgement 540a, and wait a predetermined period of time 570c (e.g., SIFS).

After waiting for predetermined period of time 570c, devices in the RCCA group continue waiting for a transmission slot 580a. After waiting transmission slot 580a, HID2 530b, HID3 530c, HID4 530d, HID5 530e, and HID6 530f decrement their unique back-off count. After decrementing its unique back-off count and determining that its value is 0, and waiting transmission slot 580a, HID2 530b may transmit data. In this example, HID2 530b does not have data to transmit so the channel remains free. Devices in the RCCA group sense that the channel has remained free without any transmission of data and continue waiting for a transmission slot 580b. After waiting for transmission slot 580b, HID3 530c, HID4 530d, HID5 530e, and HID6 530f decrement their unique back-off count by one. After decrementing its unique back-off count and determining that its value is 0 and waiting transmission slot 580a, HID3 530c may transmit data. In this example, HID3 530c does not have data to transmit so the channel remains free. Devices in the RCCA group sense that the channel has remained free without any transmission of data and continue waiting for a transmission slot 580c.

After waiting for transmission slot 580c, HID4 530d, HID5 530e, and HID6 530f decrement their unique back-off count. After decrementing its unique back-off count and determining that its value is 0, and waiting transmission slot 580c, HID4 530d may transmit data. In this example, HID4 530d does not have data to transmit so the channel remains free. Devices in the RCCA group sense that the channel has remained free without any transmission of data and continue waiting for a transmission slot 580d.

After waiting for transmission slot 580d, HID5 530e and HID6 530f decrement their unique back-off count. After decrementing its unique back-off count and determining that its value is 0, and waiting transmission slot 580d, HID5 530e may transmit data. In this example, HID5 530e does not have data to transmit so the channel remains free. Devices in the RCCA group sense that the channel has remained free without any transmission of data, and continue waiting for a transmission slot 580e.

After waiting for predetermined period of time 580e, HID6 530f decrements its unique back-off count. After decrementing its unique back-off count and determining that its value is 0 and waiting transmission slot 580e, HID6 530f may transmit packet 560. Devices in the RCCA group sense that the transmission of data and wait a predetermined period of time 570d. Host 520 then sends an acknowledgement 540b. As devices in the RCCA group have had an opportunity to transmit data on the channel, the RCCA group relinquishes control of the channel.

Figure 6:
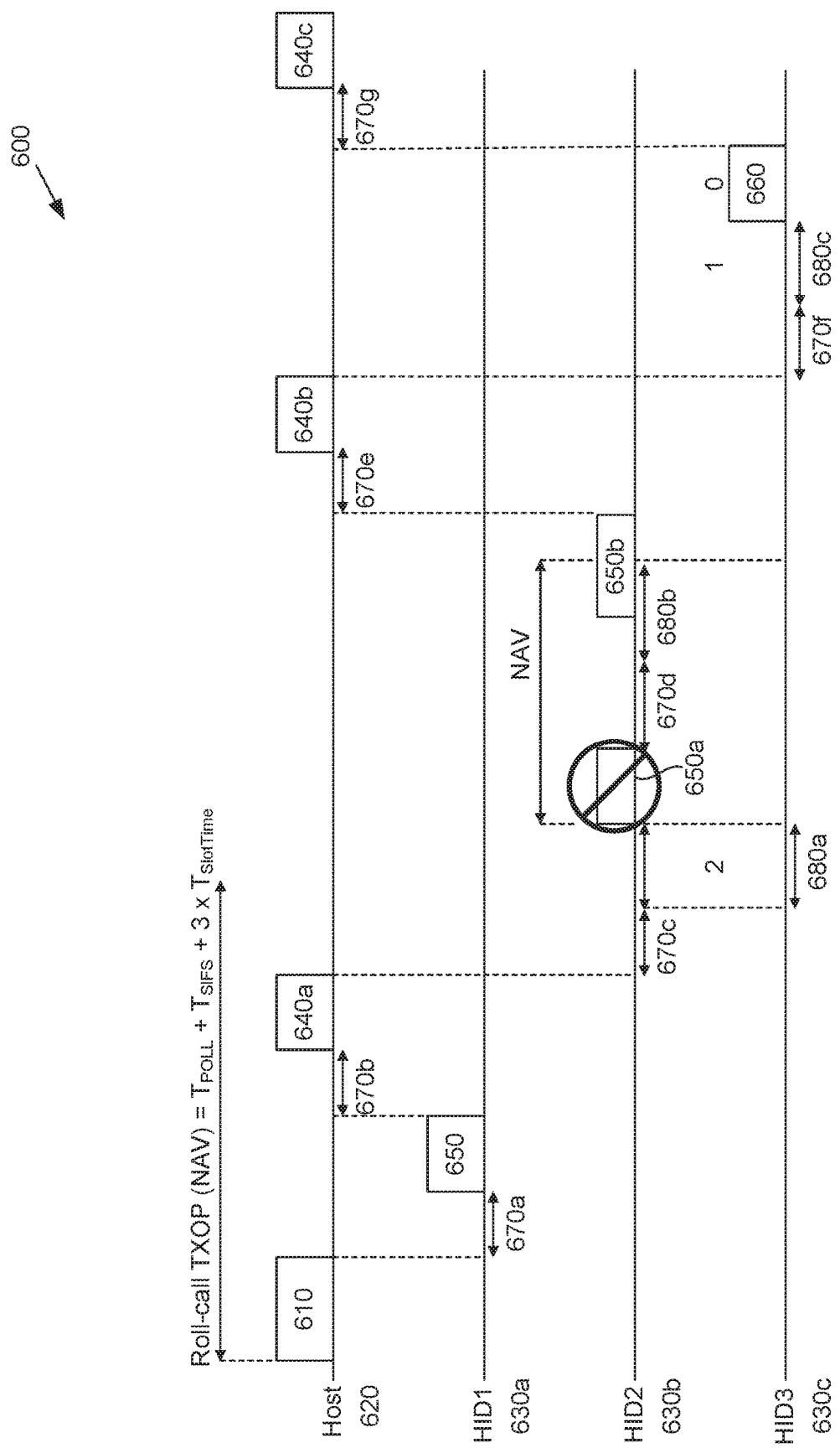

FIG. 6 illustrates another example of an RCCA mechanism, according to some embodiments of the disclosure. Host 620 is equivalent to, e.g., electronic device 130f, and group members 630a-c are equivalent to, e.g., electronic devices 130g-i. In this embodiment, group members 630a-c are HIDs and are assigned, as identifiers, HID1, HID2, and HID3, respectively. In this discussion, group members 630a-c will also be addressed based on their respective identifiers. However, group members 630a-c are not limited to HIDs and may be implemented as other types of devices as discussed above. In this example, group member, or HID1, 630a, group member, or HID2, 630b, and group member, or HID3, 630c may have data to send. After contending for and obtaining access to the channel during a contention period (e.g., EDCA/DCF), host 620 transmits a poll frame 610. Transmission of the poll frame 610 can mark the beginning of the roll-call transmission opportunity over the channel for the RCCA group. In this example, because there are three HIDs within the RCCA group, the roll-call transmission opportunity may be calculated using the following formula:

$$\text{RCCA Transmission Opportunity} = T_{poll} + T_{sifs} + 3 \times T_{slottime}$$

In this example, host 620 assigns HID1 630a a unique back-off count of 0, HID2 630b a unique back-off count of 1, and HID3 630c a unique back-off count of 2. After host 620 transmits poll frame 610, devices in the RCCA group (e.g., host 620 and HIDs 630a-c) wait a predetermined period of time 670a (e.g., SIFS). Because HID1 630a has an assigned unique back-off count of 0, HID 630a does not need to wait for transmission slots before transmitting its packet 650 on the channel. HID2 630b and HID3 630c have a unique back-off count of 1 and 2, and therefore wait 1 and 2 transmission slots respectively, before transmitting data.

After HID1 630a transmits packet 650, the channel is free and devices within the RCCA group (e.g., host 620 and HIDs 630a-c) wait a predetermined period of time 670b (e.g., SIFS). If the channel remains free during predetermined period of time 670b (e.g., no devices within the RCCA group is using the channel), host 620 transmits an acknowledgement 640a on the channel. After transmission of acknowledgement 640a, the channel becomes free again, and devices in the RCCA group wait a predetermined period of time 670c (e.g., SIFS) and a transmission slot 680a. If the channel remains free during predetermined time period 670c and transmission slot 680a, HID2 630b, which has a unique back-off count of 1, decrements its unique back-off count based on waiting transmission slot 680a. HID2 630b now has a unique back-off count of 0. Concurrently, HID3 630c, which has a unique back-off count of 2, decrements its unique back-off count and has a resulting unique back-off count of 1.

After decrementing its unique back-off count and determining that its value is 0 and waiting transmission slot 680a, HID2 630b transmits its packet 650a. In some embodiments, there may be an error in transmission that results in the HID2 630 having to retransmit the data. Before transmitting a second packet 650b, HID2 630b waits a predetermined period of time 670d as well as a transmission slot 680b. However, HID3 630c does not decrement its unique back-off count based on transmission slot 680b because transmission slot 680b occurs within a transmission opportunity window, or NAV, for HID2 630b.

A packet 650a includes a duration parameter indicating the transmission opportunity window within which HID2 630b may transmit data on the channel. The transmission opportunity window for each HID may be calculated using the following formula, where $T_{PPDU}$ represents the time to transmit an 802.11 frame, and $T_{ACK}$ represents the time to transmit an acknowledgement:

$$\text{Transmission Opportunity Window (NAV)} = T_{PPDU} + T_{SIFS} + T_{ACK}$$

Other devices in the RCCA group pause decrementing their back-off count until the NAV for HID2 reaches zero.

After waiting a predetermined period of time 670d and a transmission slot 680b, HID2 630b retransmits data in the form of packet 650b. If this attempt is successful, devices in the RCCA group wait a predetermined period of time 670e, and host 620 transmits an acknowledgement 640b. After transmission of acknowledgement 640b, the channel becomes free again, and devices within the RCCA group wait a predetermined period of time 670f (e.g., SIFS) and a transmission slot 680c. After waiting transmission slot 680c and with the expiration of the NAV for HID2 630b, HID3 630c (which currently has a unique back-off count of 1) decrements its unique back-off count. After decrementing its unique back-off count, determining that its value is 0, and waiting transmission slot 680f, HID3 630c transmits its packet 660. After a predetermined period 670g, host 620 transmit an acknowledgement 640c.

Figure 7:
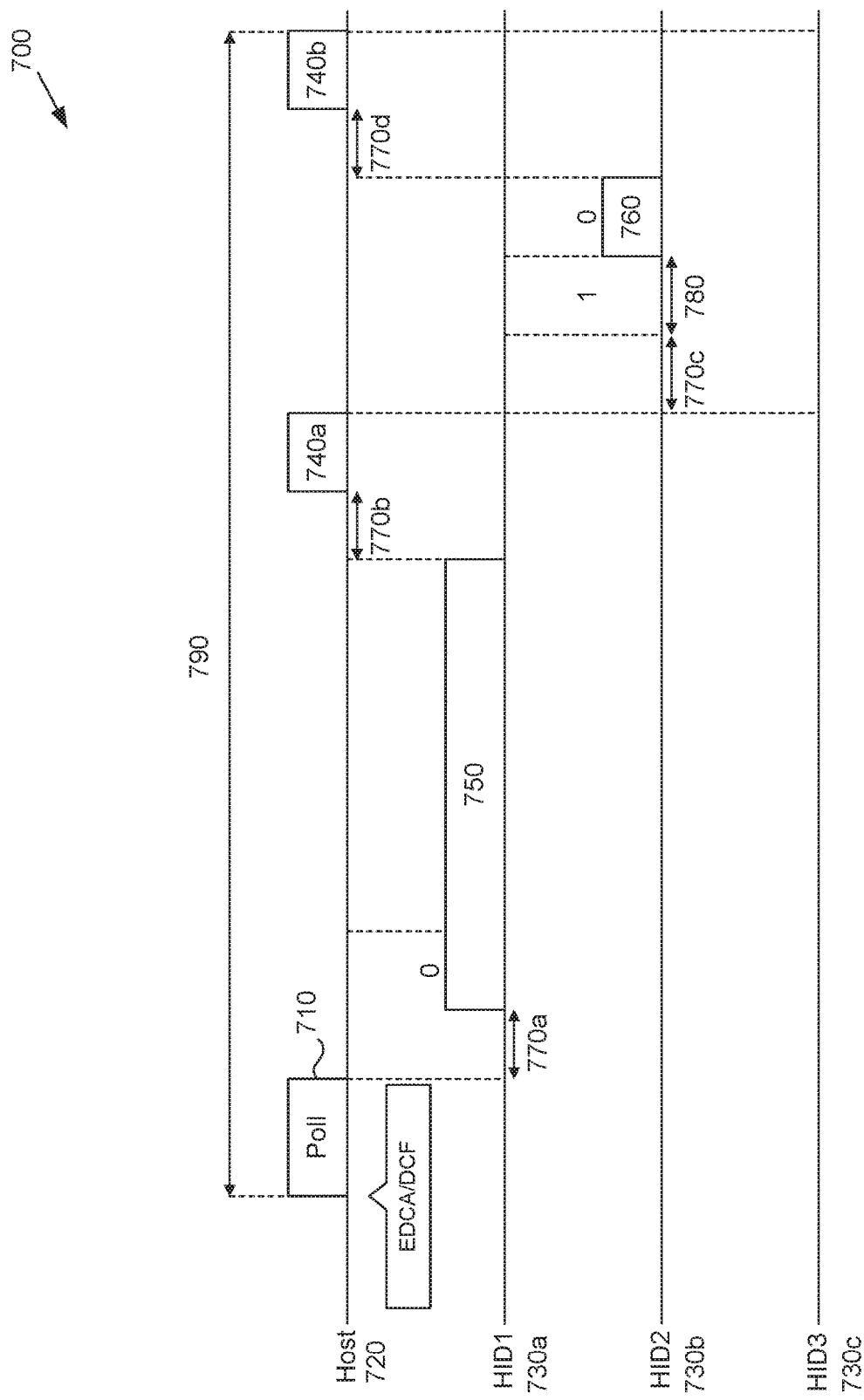

FIG. 7 illustrates another example of an RCCA mechanism, according to some embodiments of the disclosure. A host 720 is equivalent to, e.g., electronic device 130f, and group members 730a-c are equivalent to, e.g., electronic devices 130g-i. In this embodiment, group members 730a-c are HIDs and are assigned, as identifiers, HID1, HID2, and HID3, respectively. In this discussion, group members 730a-c will also be addressed based on their respective identifiers. However, group members 730a-c are not limited to HIDs and may be implemented as other types of devices as discussed above. In this example, group member, or HID1 730a, group member, or HID2, 730b, and group member, or HID3, 730c may have data to send. After contending for and obtaining access to the channel during a contention period (e.g., EDCA/DCF), host 720 transmits poll frame 710. Transmission of the poll frame 710 can mark the beginning of the roll-call transmission opportunity over the channel for the RCCA group. In this example, host 720 may calculate a roll-call transmission opportunity limit 790, which represents the maximum period of time that the RCCA group may control the channel. Poll frame 710 may include the roll-call transmission opportunity limit.

In this example, host 720 assigns HID1 730a a unique back-off count of 0, HID2 730b a unique back-off count of 1, and HID3 730c a unique back-off count of 2. After host 720 transmits poll frame 710, devices in the RCCA group (e.g., host 720 and HIDs 730a-c) wait a predetermined period of time 770a (e.g., SIFS). Because HID1 730a has an assigned unique back-off count of 0, HID1 730a does not need to wait any transmission slots before transmitting its packet 750 on the channel. HID2 730b and HID3 730c have a unique back-off count of 1 and 2 and therefore wait 1 and 2 transmission slots respectively, before transmitting data.

After HID1 730a transmits packet 750, the channel is free and devices within the RCCA group (e.g., host 720 and HIDs 730a-c) wait a predetermined period of time 770b (e.g., SIFS). If the channel remains free during predetermined period of time 770b (e.g., no devices within the RCCA group is using the channel), host 720 transmits an acknowledgement 740a on the channel. After transmission of acknowledgement 740a, the channel becomes free again, and devices again wait a predetermined period of time 770c (e.g., SIFS) and a transmission slot 780. If the channel remains free during predetermined time period 770c and transmission slot 780, HID2 730b, which has a unique back-off count of 1, decrements its unique back-off count based on waiting transmission slot 780. HID2 730b now has a unique back-off count of 0. Concurrently, HID3 730c (which has a unique back-off count of 2) decrements its unique back-off count and has a resulting unique back-off count of 1.

After decrementing its unique back-off count and determining that its value is 0 and waiting transmission slot 780, HID2 730b transmits a packet 760. After transmission of packet 760, devices within the RCCA group wait predetermined period of time 770d (e.g., SIFS). If the channel remains free during a predetermined period of time 770d, host 720 transmits an acknowledgement 740b on the channel. After transmission of acknowledgement 740b, host 720 may determine that the RCCA group is approaching the roll-call transmission opportunity limit and relinquishes control of the channel. In this example, transmissions of packets 750 and 760 utilize the entire roll-call transmission opportunity limit and HID3 730c has no time to transmit data. Therefore, HID3 730c aborts any frame transmission scheduled for this roll-call transmission opportunity. In some embodiments, HID2 330b may determine that transmission of packet 760 may not complete prior to the roll-call transmission opportunity limit, and will shorten the length of transmission of packet 760 so that the RCCA group may relinquish control of the channel so as to not exceed the roll-call transmission opportunity limit.

Figure 8:
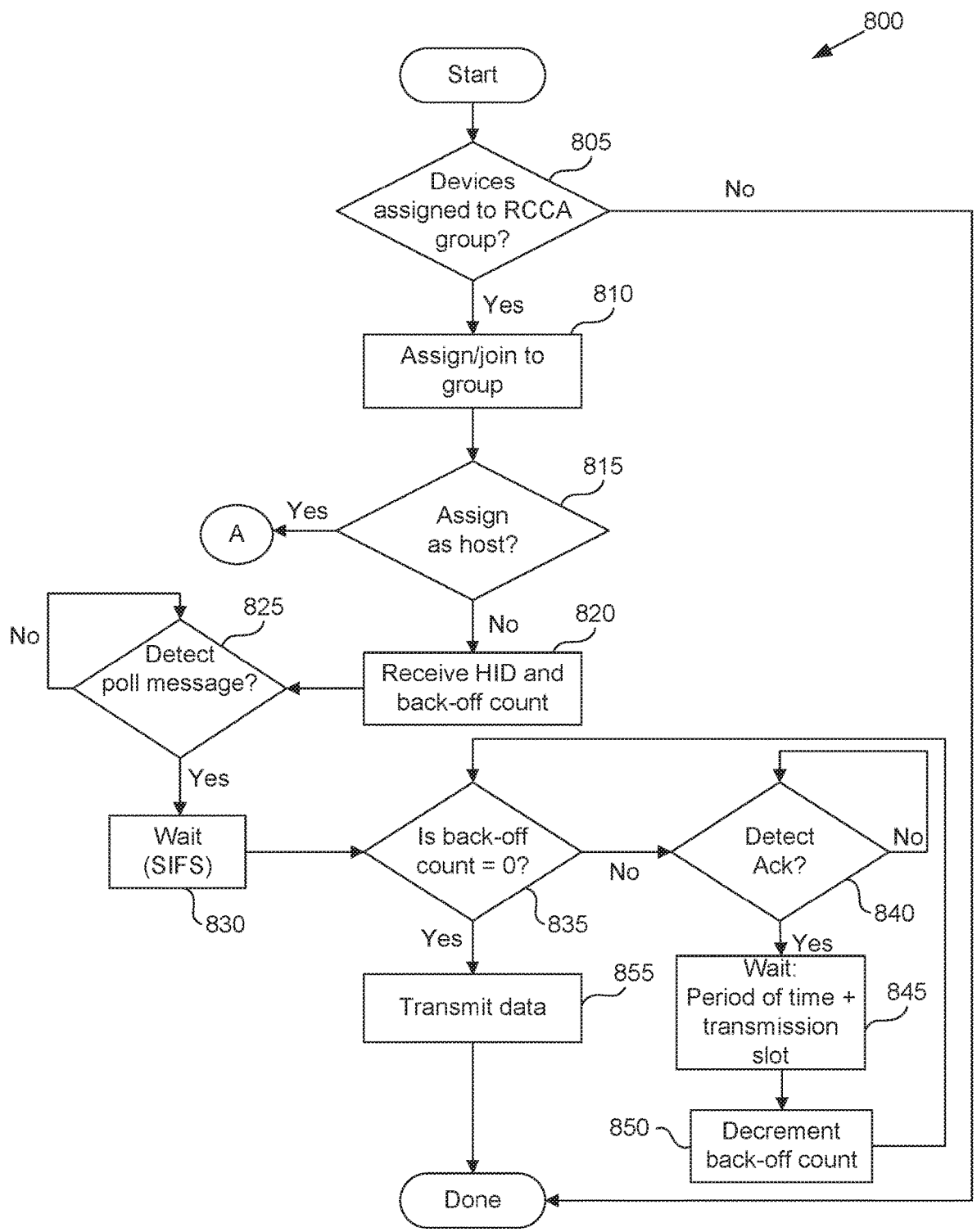
FIGS. 8-9 illustrate example methods for roll-call channel access mechanisms, according to some embodiments of the disclosure.

FIG. 8 illustrates an example method 800 for an RCCA mechanism performed by a group member of an RCCA group, according to some embodiments of the disclosure. At 805, an electronic device may determine whether it is participating within an RCCA group. If no, then the electronic device does not participate in the RCCA mechanism. If yes, the electronic device may join or be assigned to an RCCA group at 810. The electronic device may actively join an RCCA group by joining an existing RCCA group, or creating a new RCCA group. Alternatively, the electronic device may be assigned to an existing RCCA group by an access point or host of the existing RCCA group.

At 815, the electronic device determines whether it has been assigned as host of the RCCA group. If yes, the electronic device conducts host functions as described further below with regard to FIG. 9. If no, the electronic device is assigned an identifier and a unique back-off count at 820. Either the access point or host may assign these values to the electronic device.

Once assigned an identifier and a unique back-off count, the electronic device waits to detect a polling message to be sent at 825, which indicates that the host of the RCCA group has been granted access to a channel. Once detected, the electronic device waits for a predetermined period of time (e.g., SIFS) at 830. After waiting the predetermined period of time, the electronic device checks its unique back-off count to determine whether it is equal to 0 at 835. At 855, if the electronic device determined that its unique back-off count is equal to 0, the electronic device transmits its data on the channel. After transmission of its data, the electronic device's turn within the roll-call transmission opportunity is completed. Although not shown in FIG. 8, the electronic device may wait for the ACK of its transmitted data.

When the electronic device determines that its unique back-off count is not equal to 0, at 840 it monitors the channel for an acknowledgement to be sent by the host. If the acknowledgement is detected, at 845 the electronic device waits for a predetermined period of time (e.g., SIFS) plus one transmission slot. At 850, the electronic device may decrement its unique back-off count, and proceeds back to 835 to determine whether it may transmit its data.

Figure 9:
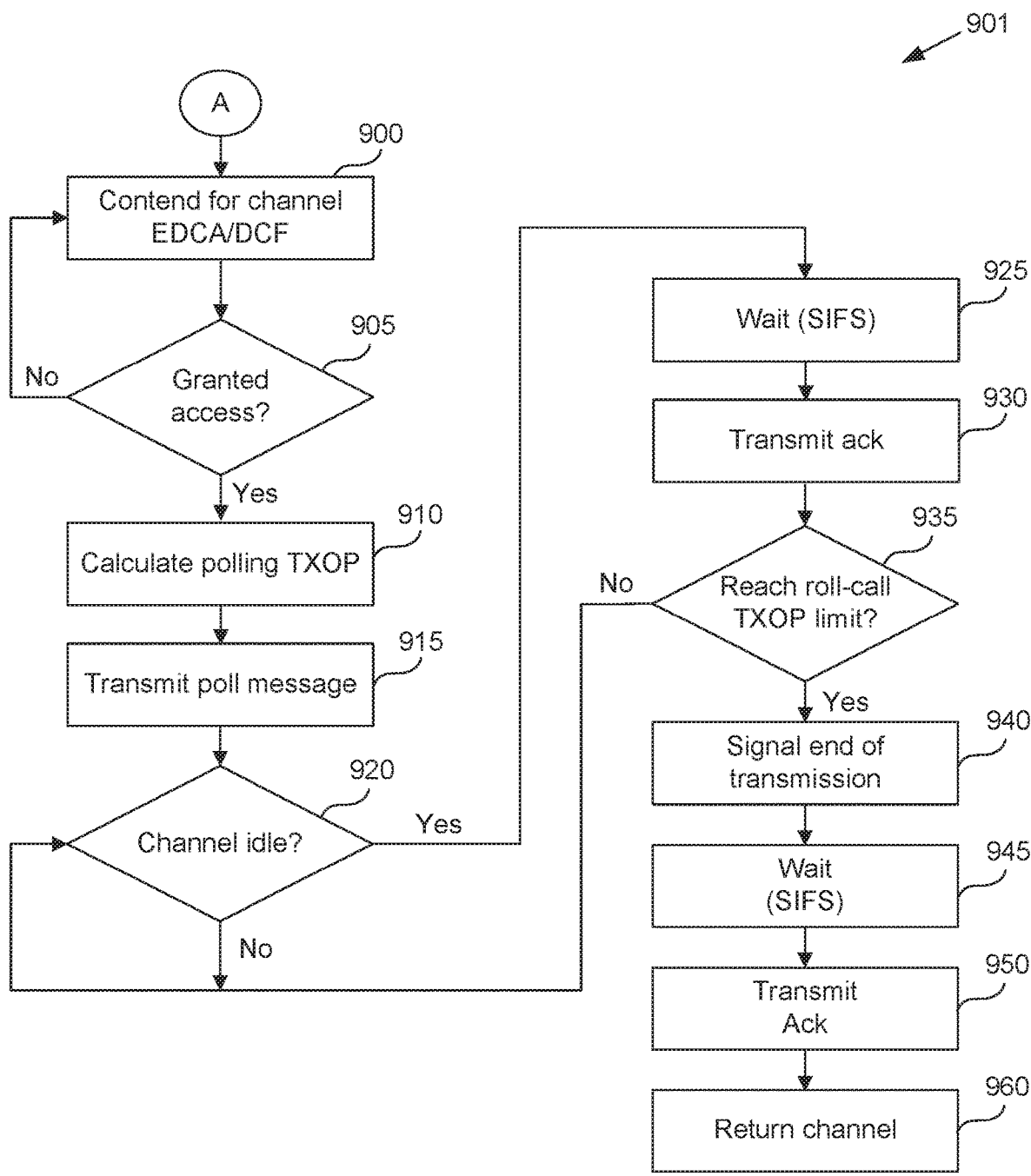

FIG. 9 illustrates an example method 900 for an RCCA mechanism performed by a host of an RCCA group, according to some embodiments of the disclosure. At 901, the host contends for access to a channel (e.g., using EDCA/DCF) on behalf of its RCCA group. At 905, the host determines whether it has been granted access to the channel. If not, the host contends for the channel at the next opportunity 901. At 910, if the host has been granted access to the channel, it calculates a roll-call transmission opportunity. As discussed above, the roll-call transmission opportunity represents the minimum time required for the last group member in the RCCA group to be able to transmit data; the time duration for the roll-call transmission opportunity may be extended if intervening group members transmit data on the channel. During this operation, the host may also calculate the roll-call transmission opportunity limit, which represents the maximum duration that the RCCA group controls the channel.

At 915, the host transmits a polling message to indicate that it has been granted access to the channel. The polling message may include the calculated roll-call transmission opportunity and/or the roll-call transmission opportunity limit. At 920, the host determines whether the channel is idle, which indicates whether the channel is being used by the RCCA group for transmission of data. If the host determines that the channel is not idle, then the host continues monitoring to determine whether the channel is idle 920.

At 925, when the host determines that the channel is idle (e.g., an electronic device has completed transmission of its data), the host waits a predetermined period of time (e.g., SIFS). After waiting the predetermined period of time, the host transmits an acknowledgement for the data that was transmitted by an electronic device within the RCCA group at 930.

At 935, the host determines whether the RCCA group is nearing the calculated roll-call transmission opportunity limit. If not, the RCCA group may continue transmitting data over the channel, and the host waits for the next transmission of data by an electronic device by repeating 920. If the RCCA group is nearing the calculated roll-call transmission opportunity limit, the host sends a signal indicating the end of transmissions by the RCCA group at 940. At 950, the host waits a predetermined period of time (e.g., SIFS). After waiting the predetermined period of time, the host transmits an acknowledgement for the data that was transmitted by an electronic device within the RCCA group at 950. The host then returns the channel at 960.

Figure 10:
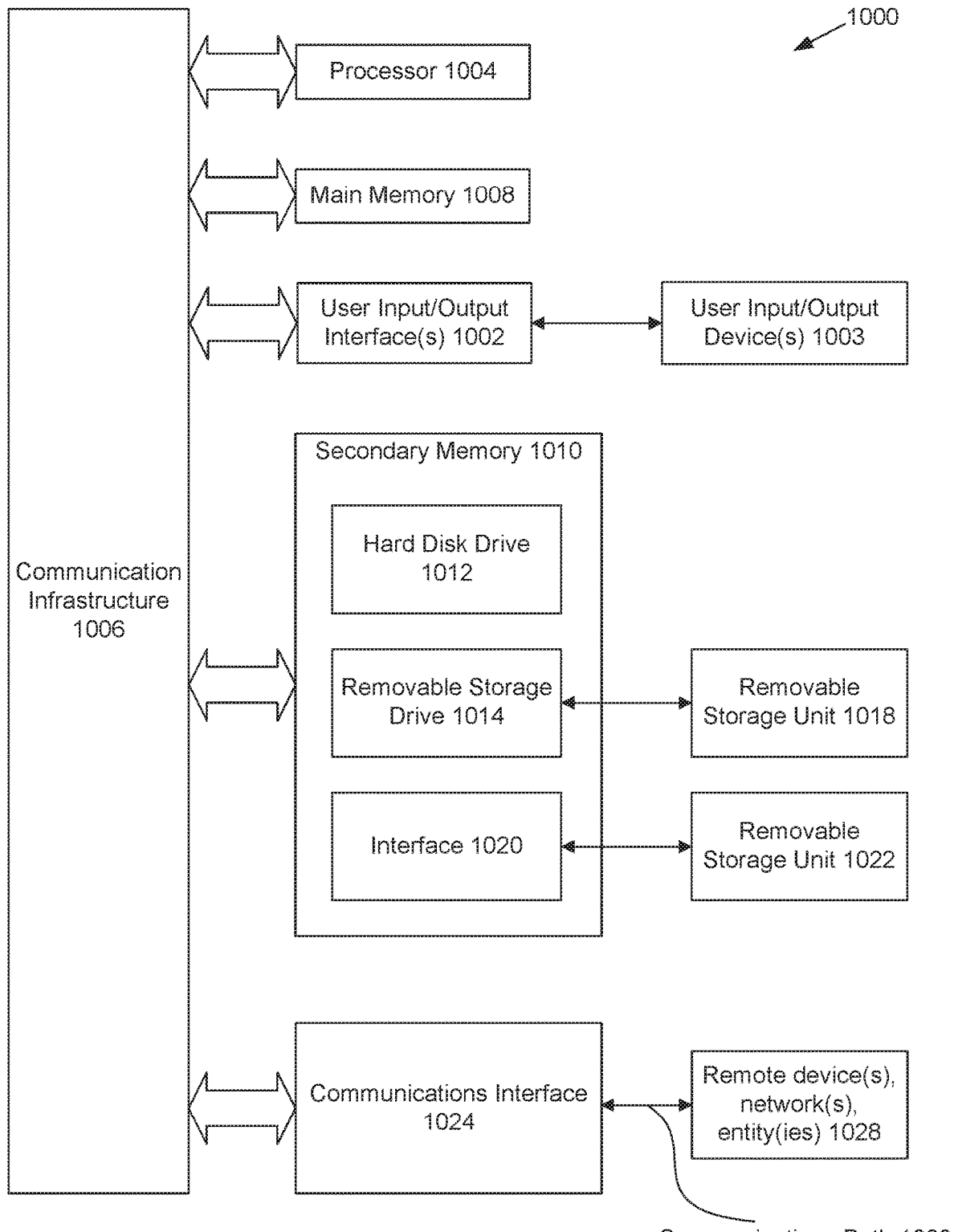
FIG. 10 is an example computer system for implementing various embodiments.

Various embodiments can be implemented, for example, using one or more well-known computer systems, such as computer system 1000 shown in FIG. 10. Computer system 1000 can be any well-known computer capable of performing the functions described herein. For example, and without limitation, processing systems 100, 200, 300, 400, 500, 600, or 700, (and/or other apparatuses and/or components shown in the figures) may be implemented using computer system 1000, or portions thereof. Methods 800 and 900 may also be implemented using computer system 1000, or portions thereof.

Computer system 1000 includes one or more processors (also called central processing units, or CPUs), such as a processor 1004. Processor 1004 is connected to a communication infrastructure or bus 1006.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1010, such as random access memory (RAM). Main memory 1010 may include one or more levels of cache. Main memory 1010 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

The operations in the preceding embodiments can be implemented in a wide variety of configurations and architectures. Therefore, some or all of the operations in the preceding embodiments may be performed in hardware, in software or both. For example, at least some of the operations may be implemented using firmware in communications interface 1024 and/or the PHY layer of communications interface 1024, such as hardware in an interface circuit. In particular, OFDMA may be implemented in the PHY layer, timing may be implemented in a lower portion of the data-link or MAC layer, and management may be implemented in an upper portion of the data-link or MAC layer (such as in a driver).

In an embodiment, a tangible apparatus or article of manufacture comprising a tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A method for providing access to a channel, comprising:
forming, by a host device, a roll-call group comprising at least a first device and a second device, wherein the first device is associated with a first traffic type having a first priority and the second device is associated with a second traffic type different from the first traffic type and having a second priority, wherein each of the first traffic type and the second traffic type includes one of a video data, background data, best effort data, or voice data;
assigning, by the host device, a first back-off count to the first device and a second back-off count to the second device, wherein the first back-off count is based on the first priority and indicates a first time slot in which the first device can transmit first data over the channel and the second back-off count is based on the second priority and indicates a second time slot in which the second device can transmit second data over the channel, wherein the first and second back-off counts are further based at least in part on a number of devices within the roll-call group;
contending, on behalf of the roll-call group by the host device, for control of the channel for transmission of the first data by the first device and transmission of the second data by the second device; and
transmitting, to the roll-call group by the host device, after receiving control of the channel, a polling message comprising a roll-call transmission period.

2. The method of claim 1, further comprising:
sensing a packet transmission by the first device;
waiting a first waiting period upon sensing the transmission of the packet; and
transmitting an acknowledgement message after the first waiting period.

3. The method of claim 2, wherein the first waiting period is based at least in part on a short inter-frame space duration.

4. The method of claim 1, further comprising:
calculating a roll-call transmission period limit indicating a maximum duration for which the roll-call group controls the channel.

5. The method of claim 4, wherein the polling message further includes the roll-call transmission limit.

6. The method of claim 1, further comprising:
calculating, by the host device, the roll-call transmission period based at least in part on (i) a first time value associated with the polling packet, (ii) a second time value associated with a short inter-frame space, and (iii) a third time value generated based on the number of devices in the roll-call group and a slot time.

7. The method of claim 1, wherein the first and second back-off counts correlate to a number of time slots within the roll-call transmission period.

8. The method of claim 1, further comprising:
forming a second roll-call group comprising a third device and a fourth device;
assigning, by a second host device, a third back-off count to the third device and a fourth back-off count to the fourth device;
contending, by the second host device, for control of the channel; and
transmitting by the second host device, after receiving control of the channel, a second polling message comprising a second roll-call transmission period.

9. The method of claim 1, wherein forming the roll-call group is based at least in part on a criteria shared between the first and second devices.

10. A method for providing access to a channel, comprising:
joining, by a first device and a second device, a roll-call group formed by a host device, wherein the first device is associated with a first traffic type having a first priority and the second device is associated with a second traffic type different from the first traffic type and having a second priority, wherein each of the first traffic type and the second traffic type includes one of a video data, background data, best effort data, or voice data;
transmitting, by the first device to the host device of the roll-call group, a message to remain within the roll-call group;
receiving, at the first device, a first back-off count that is based on the first priority and indicating a first time slot in which the first device is permitted to transmit data;
receiving, at the second device, a second back-off count that is based on the second priority and indicating a second time slot in which the second device is permitted to transmit data;
determining, by the first device, a channel availability for transmitting the data;
transmitting, by the first device, the data over the channel responsive to determining the channel availability and based at least in part on identifying a transmit opportunity corresponding to the first back-off count; and
leaving, by the first device, the roll-call group after transmitting the data.

11. The method of claim 10, wherein determining the channel availability further comprises waiting a predetermined amount of time before transmitting.

12. The method of claim 11, wherein the predetermined amount of time comprises a short inter-space duration and a transmission opportunity.

13. The method of claim 10, further comprising:
decrementing, by the first device, the first back-off count in response to sensing that the channel is available for transmitting the data.

14. An electronic device comprising:
a processor configured to:
form, by the electronic device, a first roll-call group comprising at least a first device and a second device, wherein the first device is associated with a first traffic type having a first priority and the second device is associated with a second traffic type different from the first traffic type and having a second priority, wherein each of the first traffic type and the second traffic type includes one of a video data, background data, best effort data, or voice data;
assign, by the electronic device, a first back-off count to the first device and a second back-off count to the second device, wherein the first back-off count is based on the first priority and indicates a first time slot in which the first device can transmit first data and the second back-off count is based on the second priority and indicates a second time slot in which the second device can transmit second data;
form, by the electronic device, a second roll-call group comprising at least a third device and a fourth device;
assign, by the electronic device, a third back-off count to the third device;

assign, by the electronic device, a fourth back-off count to the fourth device;

contend, by the electronic device, for control of the channel on behalf of the first roll-call group or the second roll-call group; and after receiving control of the channel, transmit, by the electronic device, a polling message comprising a roll-call transmission period, wherein the roll-call transmission period indicates a contention-free period during which the first roll-call group or second roll-call group controls the channel.

15. The electronic device of claim 14, wherein the processor is further configured to:

sense a packet transmission by the first device or the second device;

wait a first waiting period upon sensing the transmission of the packet; and transmit an acknowledgement message after the first waiting period.

16. The electronic device of claim 14, wherein the first waiting period is based at least in part on a short inter-frame space duration.

17. The electronic device of claim 14, wherein the processor is further configured to:

calculate the roll-call transmission period based at least in part on (i) a first time value associated with the polling packet, (ii) a second time value associated with a short inter-frame space, and (iii) a third time value generated based on a number of devices in the first roll-call group or the second roll-call group and a slot time.

18. The electronic device of claim 14, wherein the electronic device forms the first roll-call group based at least in part on the first traffic type.

19. The electronic device of claim 14, wherein the first back-off count indicates a first time slot during which the first device transmits the data over the channel and the second back-off count indicates a second time slot during which the second device transmits second data over the channel.

20. The electronic device of claim 14, wherein the first and second back-off counts are based at least in part on a number of devices within the first roll-call group.

21. The electronic device of claim 14, wherein the processor is further configured to:

optimize a first enhanced distributed channel access (EDCA) parameter for the first roll-call group based on the first traffic type; and optimize a second EDCA parameter for the second roll-call group based on the second traffic type.

\* \* \* \* \*